FIG_1
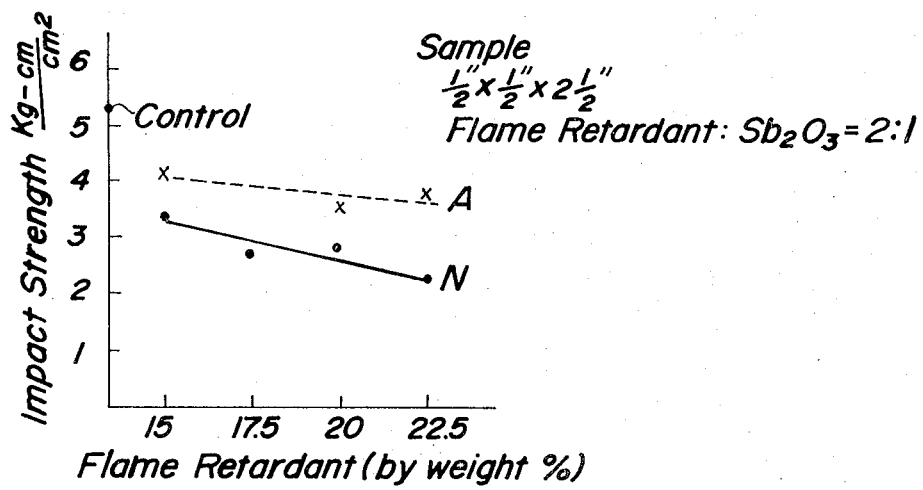
FIG_2
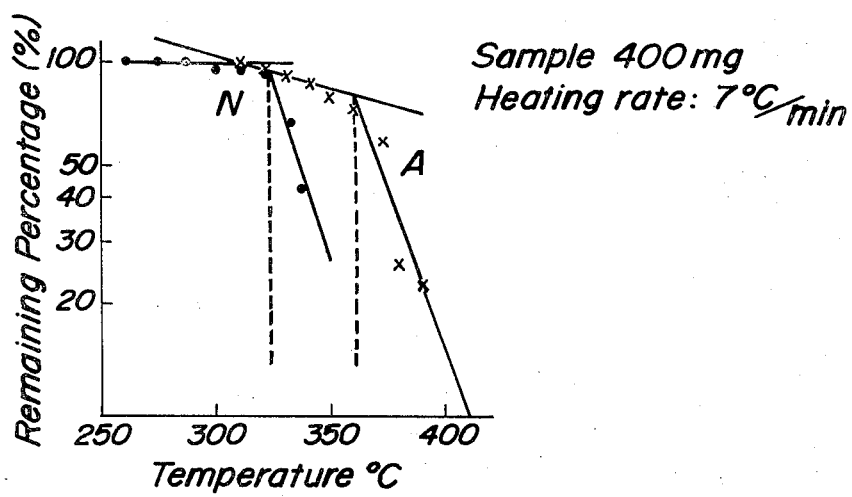

FIG_3
Relation between addition amount and impact strenght
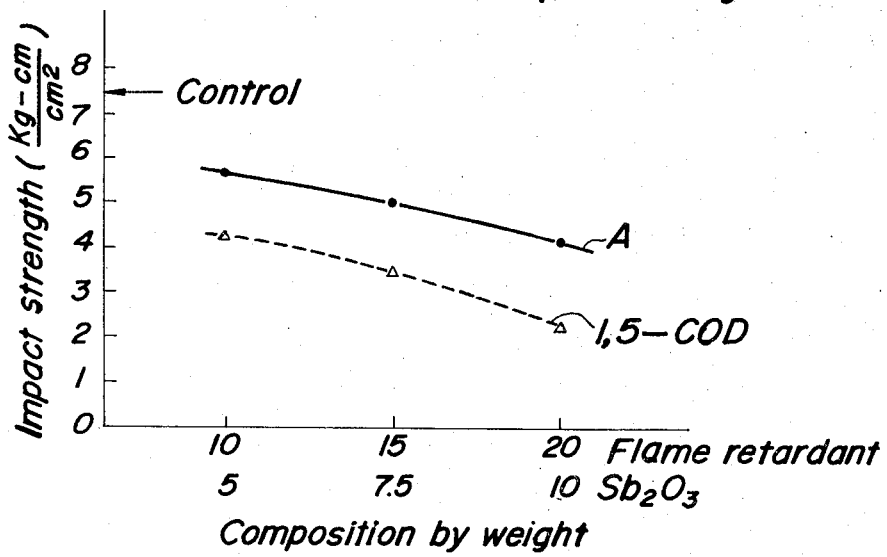
FIG_4
Relation between addition amount and melt index
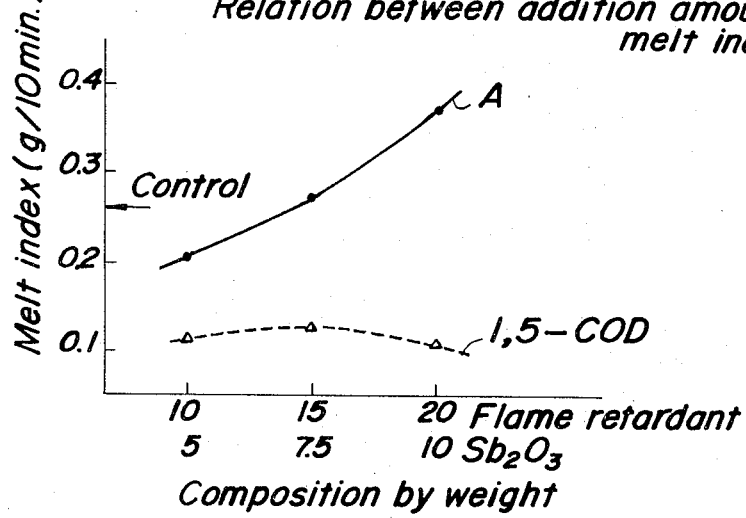

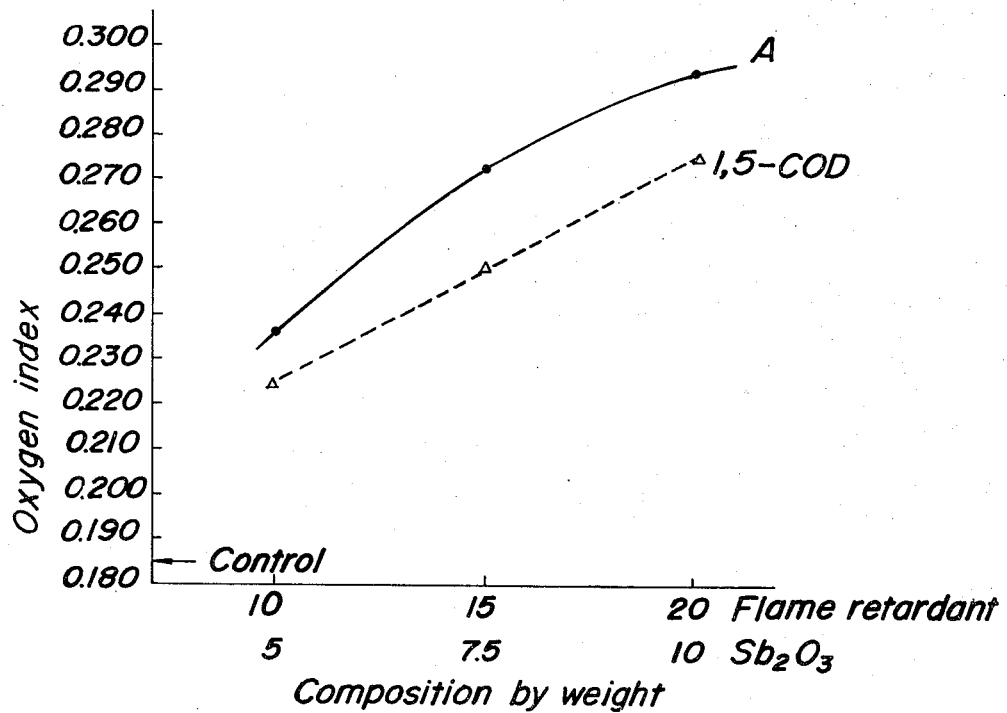

3,828,003
FLAME RESISTANT POLYMER COMPOSITIONS

Shingo Yamazaki, Daito, Akira Takemura and Kazumi Kojima, Amagasaki, Masato Nishimura, Daito, Teruo Tsuchida, Toyonaka, and Tadashi Yonemoto, Amagasaki, Japan, assignors to Nippon Oils and Fats Company Limited, Tokyo, Japan
Continuation-in-part of abandoned application Ser. No. 192,033, Oct. 26, 1971. This application Jan. 26, 1973, Ser. No. 326,800
Claims priority, application Japan, Oct. 26, 1970, 45/94,096
Int. Cl. C09k 3/28
U.S. Cl. 260—45.75 B                    4 Claims

ABSTRACT OF THE DISCLOSURE

Flame resistant polymer composition which comprises a flammable polymer and an amount effective for flame retarding of a chlorine-containing compound having the following structure:

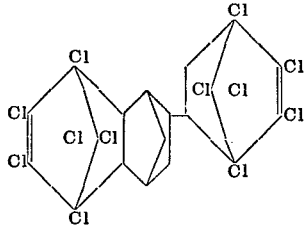

This application is a continuation-in-part of the copending application Ser. No. 192,033 filed on Oct. 26, 1971, now abandoned.

The present invention relates to flame resistant polymer compositions in which a flammable organic polymer (referred to as "polymer" hereinafter) is added with a Diels-Alder addition product (referred to as "chlorine-containing addition product" hereinafter) of a hexachlorocyclopentadiene with 2-vinylbicyclo(2·2·1)-heptene-5.

Various polymers have been recently produced and consumed in a large amount as materials for a broad field of uses, such as electric appliances, transporting materials, building materials and the like but the polymers have a defect in view of the flammability. In order to solve the defect a process wherein these polymers are provided with the flame resistance by adding organic halogen compounds has been proposed but these flame retardants must be used in a large amount in order to provide a satisfactory flame resistance, while in many cases the excellent physical properties of the polymers are deteriorated by such a large amount of the flame retardants.

An object of the present invention is to provide a means by which a satisfactory flame resistance is provided to the polymer and particularly the deflection temperature of the thermoplastic polymers among important physical properties of the polymers is rather increased and the hardness is improved without substantially decreasing the impact strength of the polymers. Furthermore, the processability of the polymer can be remarkably improved by the addition of the chlorine-containing addition product, that is the melt index is improved. Furthermore, the heat stability of the obtained polymer compositions is better.

Namely, the present invention consists in flame resistant polymer compositions obtained by adding to the polymer the chlorine-containing addition product represented by the following formula

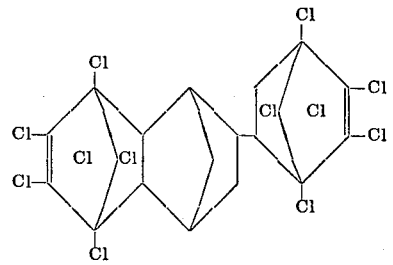

which is Diels-Alder reaction product of a hexachlorocyclopentadiene with 2 - vinylbicyclo(2·2·1)-heptene-5 which is Diels-Alder addition product of cyclopentadiene with butadiene.

Halogenated norbornenyl octahydromethanonaphthalenes having the following formula have been known as the flame retardants for thermoplastic resins (see Chemical Abstracts 73, 56725 q (1970)

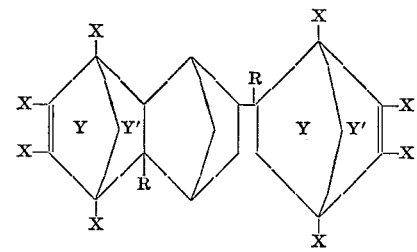

wherein R is hydrogen, chlorine or methyl group and X is halogen, Y and Y' are halogen, alkoxy group or haloalkyl group.

However, since the compound having the above described formula (A) according to the present invention is different in the chemical structure, particularly in the stereo structure from the above described compounds having the formula (S) this is, in the case of (S), the cyclohexane ring of the center ring has a plane structure, while the center ring of the formula (A) is a norbornane ring and has no plane structure and has a distortion. In view of the difference in the structure, both the compounds have a great difference in the melting point, heat stability and solubility and the former compound is considerably superior to the latter compounds in the influence on physical properties of the starting resins as mentioned in the following examples.

Furthermore, U.S. Pat. 3,403,036 has proposed the flame retardant having the following general formula

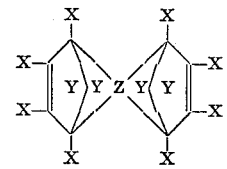

wherein X is Br, Cl or F and Y is Br, Cl, F, alkyl or alkoxy group and Z is tetravalent cyclic hydrocarbon residue having at least five carbon atoms. That is, Z is tetravalent cyclic hydrocarbon residue and the following residues are exemplified in the specification,

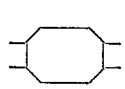 

 

while the corresponding residue in the flame retardant of the present invention is as follows:

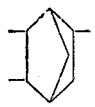

that is, trivalent cyclic hydrocarbon residue.

Namely, the flame retardant of the present invention is different from that of this reference in the chemical formula.

The flame retardants in this reference have melting points as high as above 250° C. as described in this specification and some of the flame retardants exemplified in this specification have the following melting points as shown in the specification.

| | |
|---|---|
| 1,5-COD | Above 350° C. |
| DCP | 277–278° C. |
| CP | 319° C. |
| BCH | 340° C. |

When the flame retardants having such a higher melting point are added to the polymer, the decrease of the deflection temperature of the polymer composition is prevented and the dropping in the burning can be prevented and the hardness of the polymer composition is improved, but the compatibility with the polymer is deteriorated resulting in the heterogeneous dispersion and accordingly, the impact strength is noticeably decreased and the workability for blending with the polymer becomes remarkably poor (decrease of melt index).

On the contrary, the melting point of the flame retardant in the present invention is 203° C. and moderate and when this flame retardant is added to the polymer, the deflection temperature of the polymer composition is improved more than that of the original polymer and further the compatibility with the polymer is high and the melt index is improved and the resulting polymer composition is homogeneous and the decrease of the impact strength is restrained.

Namely, the important technical progress of the flame retardant of the present invention as compared with the flame retardant in this reference lies in the following points.

The flame retardant of the present invention has a very high compatibility with the polymer while maintaining the deflection temperature sufficiently and the decrease of the impact strength of the resulting polymer composition is restrained. Furthermore, the flame retarding activity for the polymer in the flame retardant of the present invention is superior to that in the flame retardant of the reference.

The comparative test is shown in the following Example 5.

The chlorine-containing addition product according to the present invention can be produced by reacting the hexachlorocyclopentadiene with 2-vinylbicyclo(2·2·1)-heptene-5 under an inert gaseous atmosphere, such as nitrogen at a temperature of 80 to 200° C., preferably 130 to 180° C. The resulting addition product is a solid having a fairly high melting point and in order to purify said solid, a recrystallization from xylene or n-butanol or a washing with poor solvents, such as methanol, propanol, isooctane and the like is advantageous.

The polymers which can be provided with the flame resistance according to the present invention are thermoplastic polymers, such as polyethylene, polypropylene, ethylene-propylene copolymer, polystyrene, acrylonitrile-butadiene-styrene copolymer (ABS resin), acrylonitrile-styrene copolymer, etc.

The amount of the chlorine-containing addition product of the present invention to be used varies depending upon the kind of polymers but 4–50% by weight based on the polymers can provide a self-extinguishing and a satisfactory flame resistance.

Furthermore, the flame resistance can be further improved by adding antimony oxide, bismuth oxide, arsenic oxide and the like to the polymer compositions of the present invention and the amount of these substances to be used is 2–100% by weight, preferably 5–60% by weight based on the chlorine-containing addition products.

When the chlorine-containing addition product is added to the thermoplastic polymer, the addition product and the polymer are mixed by a tumbler, rolls heated at a high temperature and the like and the resulting mixture is subjected to a press molding, an extrusion molding or an injection molding. When the chlorine-containing addition product is added to the thermosetting polymer, the addition product is added to the polymer prior to the setting and then the resulting mixture is set in a conventional manner.

The invention will be explained with reference to the accompanying drawings, in which:

FIG. 1 shows the impact strength of flame resistant ABS resins added with the flame retardant (A) of the present invention or the flame retardant (N), which is explained in "Example 4," together with antimony oxide;

FIG. 2 is a graph showing the remaining amounts of the flame retardant (A) and the one (N) due to heating by means of thermobalance;

FIG. 3 is a graph showing the relation between the addition amount of the flame retardant (A) and a typical flame retardant of 1,5-COD in U.S. Pat. 3,403,036 and impact strength;

FIG. 4 is a graph showing the relation between the addition amount of the flame retardants (A) and 1,5-COD and melt index; and FIG. 5 is a graph showing the relation between the addition amount of the flame retardants (A) and 1,5-COD and oxygen index.

The following examples are given for the purpose of illustration of this invention and are not intended as limitations thereof.

The burning tests described in the following examples were followed to ASTM, D635–56T, the deflection temperature was measured following to ASTM, D648–56, and the impact strength was measured following to ASTM, D256–56, Method A. In these examples, the "part" and "percent" mean by weight.

PRODUCTION EXAMPLE

Into a 300 cc. four necked flask equipped with a thermometer, a stirrer and a reflux condenser were introduced 109 parts of hexachlorocyclopentadiene and 12 parts of 2-vinylbicyclo(2·2·1)-heptene-5 and the mixture was reacted under gaseous nitrogen at 165° C. for 25 hours and then unreacted hexachlorocyclopentadiene was distilled off at 120° C. under a reduced pressure of 5 mm. Hg and to 43 parts of the resulting brown semi-solid residue was added 150 parts of isooctane and the residue was finely pulverized, which was filtered under a suction and dried at 90° C. under 3 mm. Hg to obtain 35.8 parts of white powders having the following general formula

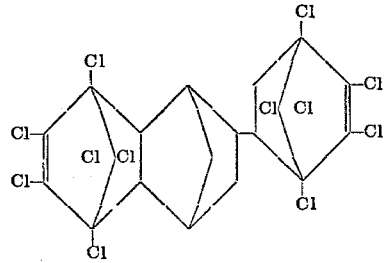

Melting point: 203° C.
Molecular weight: 662 (ebullioscopy) (calculation, 666).
Analytical value of Cl: 63.5%. Calculation: 63.9%.

This retardant is referred to as "flame retardant (A)" hereinafter.

EXAMPLE 1

Polyethylene having a high density (made by Nippon Olefin Co., Ltd.) was added with the flame retardants as shown in the following Table 1 and mixed in a tumbler and the resulting mixture was kneaded by rolls heated at 140° C. and then press molded at 140° C. Samples of 5 in. x ½ in. x ⅙ in. were prepared and the flame resistance and the deflection temperature were determined to obtain the following results.

TABLE 1

| No. | Flame resistant polyethylene (part) ||||  Self-extinguishing time (sec.) | Deflection temp., (° C.) |
|---|---|---|---|---|---|---|
| | Polyethylene | Flame retardant (A) | $Sb_2O_3$ | Tetrabromobisphenol A | | |
| 1 | 100 | | | | (¹) | 71 |
| 2 | 100 | 30 | | | 8 | 72 |
| 3 | 100 | 25 | 12.5 | | 1.5 | 70.5 |
| 4 | 100 | | | 20 | 2 | 58 |

¹ Completely burnt.

EXAMPLE 2

ABS resin (made by Ube Cycon Co., Ltd.) (Cycolac T, Trademark) was added with the flame retardants as shown in the following Table 2 and mixed in a tumbler and the resulting mixture was extruded through an extruder at 180–200° C. into a string, which was cut into pellets. From the pellets, samples having 5 in. x ½ in. x ⅙ in. were made by an injection molding machine at 200–210° C. The test results are shown in the following Table 2.

TABLE 2

| No. | Flame resistant BAS resin (part) ||||  Self-extinguishing time (sec.) | Deflection temp., (° C.) |
|---|---|---|---|---|---|---|
| | ABS resin | Flame retardant (A) | $Sb_2O_3$ | Tetrabromobisphenol A | | |
| 5 | 100 | | | | (¹) | 75 |
| 6 | 100 | 25 | | | 8 | 78 |
| 7 | 100 | 20 | 10 | | 1 | 76 |
| 8 | 100 | | | 25 | 8 | 67 |
| 9 | 100 | | 10 | 20 | 1.5 | 68 |

¹ Completely burnt.

EXAMPLE 3

Aging resistance of the flame resistant synthetic resins was determined. The samples were aged under a relative humidity of 80% at 65° C. for 50, 100, 150 and 200 hours and then the samples were left to stand in a desiccator at room temperature for 48 hours and thereafter the self extinguishing time was determined to obtain the results as shown in the following Table 3.

TABLE 3.—FLAME RESISTANCE

| No. | Flame resistant resin composition | Self-extinguishing time (sec.) |||||
|---|---|---|---|---|---|---|
| | | 0 hr.¹ | 50 hrs.¹ | 100 hrs.¹ | 150 hrs.¹ | 200 hrs.¹ |
| 10 | ABS resin, 100 parts; Flame retardant (A), 20 parts; $Sb_2O_3$, 10 parts. | 2 | 1 | 1.5 | 2 | 1 |

¹ Aging time.

As seen from the above data, the flame resistance does not lower owing to the aging.

EXAMPLE 4

ABS resin (made by Sumitomo Naugatuck Co., Ltd.) (Kralastic K-2994) was added with the flame retardant (A) and the flame retardant (N), having the above described formula (S) wherein all R, X, Y and Y' are chlorine atoms, that is 6-(1',4',5',6',7',7'-hexachloro-5'-norbornen-2'-yl)-1,2,3,4,9,9-hexachloro-1,4,4a,5,6,7,8,8a-octahydro-1,4-methanonaphthalene, together with antimony oxide and from the resulting mixtures samples were prepared in the same manner as described in Example 2 and were determined with respect to the flame resistance and physical properties to obtain the results as shown in the following Table 4. Hardness was measured following to ASTM D785 (Sample dimension: 1 in. x 1 in. x ⅛ in.) and tensile strength was measured following to JIS K-6745.

TABLE 4

| Number | Flame resistant ABS resin ||||||| |
|---|---|---|---|---|---|---|---|
| | ABS resin (part) | Flame retardant (part) | $Sb_2O_3$ (part) | Self extinguishing time (sec.) | Tensile strength (kg./cm.²) | Hardness (Rockwell) | Deflection temperature (° C.) |
| 11 | 100 | (N)10 | 5 | 57.0 | | | 79.9 |
| 12 | 100 | (N)15 | 7.5 | 8.0 | 423 | 51.2 | 81.2 |
| 13 | 100 | (N)20 | 10 | 1.0 | 373 | 51.6 | 79.3 |
| 14 | 100 | (A)10 | 5 | 44.0 | | | 81.9 |
| 15 | 100 | (A)15 | 7.5 | 2.6 | 454 | 51.4 | 84.9 |
| 16 | 100 | (A)20 | 10 | 1.5 | 390 | 54.2 | 87.0 |
| 17 | 100 | | | (¹) | 446 | 49.8 | 80.3 |

¹ Completely burnt.

As seen from the above data, the flame retardant (A) of the present invention is much more excellent than the conventional flame retardant (N).

FIG. 1 shows the impact strength of ABS resins added with the flame retardant (A) or (N) together with antimony oxide, the flame retardant (A) of the present invention marked by X is superior 15 to 30% in the impact strength than the flame retardant (N) marked by ·. In FIG. 2, the flame retardant (A) of the present invention marked by X is higher about 40° C. than the conventional flame retardant (N) marked by · in the temperature of starting decomposition and the flame retardant of the present invention has a remarkably high resistance against the thermal decomposition and is sufficiently stable even at a high processing temperature.

EXAMPLE 5

ABS resin (made by Sumitomo Naugatuck Co., Ltd.) (Kralastic K-2994) was added with the flame retardant and mixed in a tumbler and the resulting mixture was extruded through an extruder at 180–200° C. into a string, which was cut into pellets. From the pellets, samples were made by an injection molding machine at 200–210° C.

Test process

Burning test:
(1) ASTM D635-56T, dimension of sample: 5 in. x ½ in. x ⅙ in.
(2) UL-94 (Underwriters Laboratories Test Subject 94), dimension of sample: 5 in. x ½ in. x 1/16 in.
(3) ASTM D2863-70 (Oxygen index process), dimension of sample: 5 in. x ¼ in. x ⅛ in.

The higher the value, the larger the flame retarding activity.

Workability: Melt index ASTM D1238-57T
Deflection temperature: ASTM D648-56, dimension of sample: 5 in. x ½ in. x 1/16 in.
Impact strength: ASTM D256, dimension of sample: 2½ in. x ½ in. x ¼ in.
Hardness: ASTM D785, dimension of sample: 1 in. x 1 in. x ⅛ in. (thickness)

Flame retardant in U.S. Pat. 3,403,036: 1,5-COD (typical compound, 1:2 addition product of cyclooctadiene and hexachlorocyclopentadiene)

through an extruder at 170–180° C. into a string, which was cut into pellets. From the pellets, samples having the same dimension as in Example 5 were prepared in the

TABLE 5

| Number | Composition (percent by wt.) | | | Burning | | | Melt index (g./10 min.) | Deflection temperature (° C.) | Impact strength (Izod) (Kg.-cm./cm.²) | Hardness, Rockwell (H-scale) |
|---|---|---|---|---|---|---|---|---|---|---|
| | ABS resin | Flame retardant | Sb₂O₃ | ASTM D635-56T (sec.) | UL-94 (sec.) | ASTM D2863-70 | | | | |
| 18 | 100 | (A) 10 | 5 | NB, 31 | SE-II, 7.8 | 0.237 | 0.203 | 81.9 | 5.6 | |
| 19 | 100 | (A) 15 | 7.5 | NB, 3.0 | SE-I, 3.7 | 0.273 | 0.272 | 84.9 | 5.0 | 54.1 |
| 20 | 100 | (A) 20 | 10 | NB, 3.0 | SE-I, 1.8 | 0.294 | 0.372 | 87.0 | 4.1 | 54.2 |
| 21 | 100 | (1,5-COD) 10 | 5 | NB, 12 | SE-II, 12.0 | 0.226 | 0.117 | 81.4 | 4.3 | |
| 22 | 100 | (1,5-COD) 15 | 7.5 | NB, 9.5 | SE-II, 9.5 | 0.250 | 0.125 | 82.4 | 3.6 | 55.0 |
| 23 | 100 | (1,5-COD) 20 | 10 | NB, 2.0 | SE-I, 2.0 | 0.277 | 0.105 | 82.8 | 2.4 | 53.5 |
| 24 | 100 | | | Burn | Burn | 0.184 | 0.234 | 80.3 | 7.8 | 49.8 |

NOTE.—NB=Non-burning.

Comparison of A with 1,5-COD:

(1) Flame retarding activity: the flame retarding activity in A is superior to 1,5-COD in the equal addition amount as seen from the above table and FIG. 5.
(2) Workability: As seen from FIG. 4, in A, as the addition amount is increased, the workability (Melt index) increases, while in 1,5-COD, melt index of the resin added with 1,5-COD is extremely inferior to the non-added resin and the difference between 1,5-COD and A is very large.
(3) Deflection temperature: As seen from Table 5, in both A and 1,5-COD, the deflection temperature of the added resin is improved more than the non-added resin but the improvement in A is larger than in 1,5-COD.
(4) Impact strength: As seen from FIG. 3, the decrease in the impact strength of A is considerably less than that of 1,5-COD.
(5) Hardness: As seen from Table 5, in both A and 1,5-COD, this property is more improved than the non-added resin.

Conclusion: The flame retardant of the present invention is apparently different from those of U.S. Pat. 3,403,036 in the structure and the difference of the structure influences highly upon the physical properties of the resin as seen from the above comparative test.

EXAMPLE 6

Polypropylene resin (made by Mitsui Toatsu Chemical Co., Ltd. Norblene BJH-G) was added with the flame retardants as shown in the following Table 6 and mixed in a tumbler and the resulting mixture was extruded same manner as described in Example 5. The samples for the burning test (ASTM D635–56T) had a dimension of 5 in. x ½ in. x ⅙ in. and the test of the tensile strength was followed to JIS–K6745. The obtained results are shown in the following Table 6.

TABLE 6

| Number | Composition (by part) | | | Burning | | | Melt index (g./10 min.) | Impact strength (Izod) (kg.-cm./cm.²) | Hardness, Rockwell (H-scale) | Tensile strength (kg./cm.²) | Deflection temperature (° C.) |
|---|---|---|---|---|---|---|---|---|---|---|---|
| | Polypropylene resin | Flame retardant | Sb₂O₃ | ASTM D635-56T (sec.) | UL-94 (sec.) | ASTM D-2863-70 | | | | | |
| 25 | 100 | (A) 17.5 | 8.6 | NB, 24 | SE-II, 20 | 0.217 | 2.80 | 2.80 | 70.7 | 293 | 51.0 |
| 26 | 100 | (A) 20.0 | 10.0 | NB, 22 | SE-II, 18 | 0.224 | 3.17 | 2.78 | 71.4 | 269 | 51.7 |
| 27 | 100 | (A) 22.5 | 11.3 | NB, 10 | SE-I, 13 | 0.234 | 3.60 | 2.74 | 70.2 | 273 | 52.6 |
| 28 | 100 | (A) 25.0 | 12.5 | NB, 5 | SE-I, 5 | 0.243 | 3.90 | 2.69 | 69.3 | 235 | 52.2 |
| 29 | 100 | (1,5-COD) 17.5 | 8.6 | SE, 153 | SE-II, 24 | 0.217 | 1.52 | 2.74 | 71.2 | 244 | 53.1 |
| 30 | 100 | (1,5-COD) 20.0 | 10.0 | NB, 68 | SE-II, 16 | 0.222 | 1.41 | 2.62 | 72.1 | 214 | 54.4 |
| 31 | 100 | (1,5-COD) 22.5 | 11.3 | NB, 15 | SE-II, 15 | 0.231 | 1.39 | 2.49 | 68.6 | 209 | 54.9 |
| 32 | 100 | (1,5-COD) 25.0 | 12.5 | NB, 12 | SE-I, 10 | 0.235 | 1.18 | 2.34 | 69.7 | 197 | 55.2 |
| 33 | 100 | 0 | 0 | Burn | Burn | 0.183 | 1.69 | 5.82 | 79.3 | 293 | 52.5 |

As seen from the above table, the compound (A) of the present invention provides a high flame resistance to polypropylene. Particularly, the test in ASTM D635–56T shows that when the amount of the flame retardant added is small, the activity appears apparent. The more remarkable activity is that the melt index is higher, this shows that the compound (A) has an excellent compatibility to the resin and can provide a more homogeneous resin composition. Furthermore, in this compound, the reduction percentage of the tensile strength is lower.

As understandable from the melt index, the molding rate in extrusion molding or injection molding of the polypropylene composition containing the compound (A) is noticeably higher than the composition containing 1,5-COD and more than two times.

EXAMPLE 7

Polystyrene (made by Mitsubishi Monsanto K.K., Dialex HF-77 General purpose type and Dialex HT-88A-226 High Impact type) was added with the flame retardant (A) and the flame retardant (1,5-COD) and mixed in a tumbler and the resulting mixture was extruded through an extruder at 170–180° C. into a string, which was cut into pellets and then the pellets were applied to an injection molding machine to prepare samples. The tests were made following to the manner as described in Example 6 and the results are shown in the following Table 7.

TABLE 7

| Number | Composition (by part) | | | General purpose type | | | High impact type | | |
|---|---|---|---|---|---|---|---|---|---|
| | Polystyrene resin | Flame retardant | $Sb_2O_3$ | UL-94 | Deflection temperature (° C.) | Impact strength (Kg-cm/cm.²) | UL-94 | Deflection temperature (° C.) | Impact strength (Kg.-cm./cm.²) |
| 34 | 100 | (A) 10 | 5 | SE-II, 10 | 77.8 | 2.6 | SE-II, 11 | 63.6 | 5.9 |
| 35 | 100 | (A) 15 | 7.5 | SE-I, 5 | 78.6 | 2.5 | SE-II, 8 | 64.7 | 5.4 |
| 36 | 100 | (A) 20 | 10 | SE-I, 2 | 79.1 | 2.3 | SE-I, 3 | 64.7 | 5.5 |
| 37 | 100 | (1,5-COD) 10 | 5 | SE-II, 11 | 78.8 | 2.0 | SE-II, 24 | 64.4 | 5.8 |
| 38 | 100 | (1,5-COD) 15 | 7.5 | SE-I, 5 | 79.0 | 1.9 | SE-II, 16 | 64.8 | 5.0 |
| 39 | 100 | (1,5-COD) 20 | 10 | SE-I, 3 | 79.9 | 1.7 | SE-I, 11 | 65.5 | 4.8 |
| 40 | 100 | 0 | 0 | Burn | 77.4 | 2.6 | Burn | 63.4 | 7.3 |

As seen from Table 7, the compound (A) according to the present invention shows an excellent flame resistance and is low in the reduction percentage of impact strength.

What is claimed is:

1. Flame resistant polymer compositions which comprise a polymer selected from the group consisting of polyethylene, polypropylene, polystyrene, and acrylonitrile-butadiene-styrene copolymer and an amount effective for retarding burning of a compound having the chemical structure:

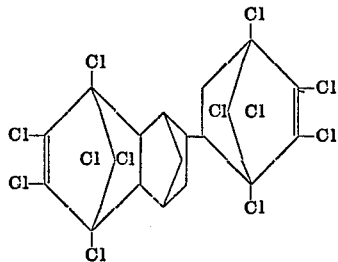

2. The flame resistant polymer composition as claimed in claim 1, wherein the amount of said chlorine-containing compound is 5 to 40% by weight based on the polymer.

3. The flame resistant polymer compositions as claimed in claim 1, which further includes antimony oxide.

4. The flame resistant polymer compositions as claimed in claim 3, wherein the amount of antimony oxide is 2 to 100% by weight based on the chlorine-containing compound.

References Cited

UNITED STATES PATENTS

| 2,913,443 | 11/1959 | Edmonds, Jr. | 260—94.2 |
| 3,403,036 | 9/1968 | Hindersinn et al. | 260—45.75 |
| 3,489,733 | 1/1970 | Natta et al. | 260—80.78 |
| 3,519,597 | 7/1970 | Weil et al. | 260—45.75 |
| 3,649,712 | 3/1972 | Grabowski | 260—873 |
| 3,711,563 | 1/1973 | Carlson et al. | 260—649 |
| 3,730,929 | 5/1973 | Breza | 260—23 |
| 3,737,468 | 6/1973 | Dombro | 260—648 |

DONALD E. CZAJA, Primary Examiner

R. A. WHITE, Assistant Examiner

U.S. Cl. X.R.

260—45.7 R, 880 R